Patented Apr. 6, 1954

2,674,534

UNITED STATES PATENT OFFICE 2,674,534

COATING COMPOSITION FOR FROZEN CONFECTIONS

Phyllis J. Carter, West Chester, Pa., assignor to Atlas Powder Company, Wilmington, Del., a corporation of Delaware No Drawing. Application November 23, 1951, Serial No. 257,957

11 Claims. (Cl. 99—166)

This invention relates to frozen confections and more particularly to flavored coatings for ice cream bars and the like.

It is an object of the invention to provide improved coatings for frozen confection bars.

A further object is to provide an emulsified coating for such bars which is readily adaptable to flavoring with either water soluble or oil soluble flavoring components.

A still further object is to provide an emulsifiable concentrate suitable for the preparation of such emulsified coatings.

The above and other objects will become apparent in the course of the following description of the invention and in the appended claims.

The above objects are accomplished by providing emulsifiable concentrates of edible vegetable oils containing dissolved or dispersed emulsifying agents, and, as coating materials for frozen confections, oil-in-water emulsions of said oils stabilized with said emulsifying agents, all as more fully described hereinafter. The said emulsions may alternatively contain sweetening, flavoring and/or coloring agents.

Edible vegetable oils suitable for the coatings of the present invention are those which are solid at the temperature of storage of ice cream and other frozen confections and which liquefy at temperatures ranging from about 75° F. to about 115° F. Vegetable oils of suitable melting range may be obtained by blending naturally occurring oils and waxes or by "hardening" liquid vegetable oils by means of controlled hydrogenation. For example, naturally occurring or hydrogenated coconut oils are satisfactory. Particularly suitable are coconut oil of melting point 76° F., "hardened" coconut oil melting at 112° to 114° F., and mixtures of the two.

The aqueous phase of the oil-in-water emulsion may contain sweetening quantities of dissolved sugar and, alternatively, minor amounts of coloring matter and/or flavoring agents.

Emulsifiers particularly suited to the preparation of coatings in accordance with the invention are esters of polyoxyethylene ethers of sorbitol and fatty acids, which esters have an HLB value (see Journal of the Society of Cosmetic Chemist, 1, 311–376, (1949)) of from 9.5 to 11.5 and conform to the formula:

$$\begin{array}{l}H_2C-O-(C_2H_4O)_a-R_1\\ H-C-O-(C_2H_4O)_b-R_2\\ H-C-O-(C_2H_4O)_c-R_3\\ H-C-O-(C_2H_4O)_d-R_4\\ H-C-O-(C_2H_4O)_e-R_5\\ H_2C-O-(C_2H_4O)_f-R_6\end{array}$$

wherein $a$, $b$, $c$, etc., are each at least one, and the sum of $a$ to $f$ is from 20 to 40; and $R_1$, $R_2$, $R_3$, etc., are selected from the group consisting of hydrogen and fatty acyl radicals containing from 12 to 18 carbon atoms, there being at least 4 of such acyl radicals.

In the above formula the carbon chain represents that of sorbitol and, for convenience, the substituted hydroxyl radicals of the sorbitol are all represented as lying on the same side of the carbon chain. The said esters are conveniently prepared by the direct esterification of the fatty acid furnishing the desired acyl radical with the proper polyoxyethylene ether of sorbitol in proportions to yield the desired ester. It will be recognized by those skilled in the emulsifying art that the range of compounds covered by the formula includes compounds which vary widely in their balance of hydrophile to lipophile properties, and that, within the said range, compounds of like balance are obtained when the number of total carbon atoms in the acyl radicals and the number of oxyethylene radicals vary in like sense. In the coating composition of the invention it is preferred to employ compounds in which the hydrophile-lipophile balance is controlled within narrower limits than the chemical formula can define. Qualitatively, if the acyl radicals are short and few (the ester is tetralaurate, for example) the total number of oxyethylene groups should be near the minimum (20, for example). Conversely, if the acyl radicals are long and many (the ester is a hexastearate, for example), the total number of oxyethylene groups should be near the maximum (40, for example). Quantitatively, reference is made to the HLB system of designating the hydrophile-lipophile balance of surface active agents, hereinbefore referred to, in which system index numbers of increasing magnitude represent agents of increasing hydrophilic character. Compounds defined by the above formula and having an HLB number, on the arbitrary scale disclosed in the cited reference, of from 9.5 to 11.5 are those which are useful as emulsifiers in the present invention. Among such compounds may be named the tetralaurate of the polyoxyethylene ether of sorbitol containing 20 oxyethylene groups per mol, the pentaoleate of the polyoxyethylene ether of sorbitol containing 30 oxyethylene groups per mol, the pentalaurate of the polyoxyethylene ether of sorbitol containing 25 oxyethylene groups per mol, the hexastearate of the polyoxyethylene ether of sorbitol containing 40 oxyethylene groups per mol. Of these compounds the first two named are preferred.

In the commercial production of polyoxyethylene ethers of sorbitol it is frequently convenient to react ethylene oxide with syrupy solutions of sorbitol containing up to 15% of water. In such preparations there are formed besides the polyoxyethylene ethers of sorbitol, polyethylene glycols which cannot be readily separated from the sorbitol ethers. The mixtures so obtained are the equivalent of the pure sorbitol polyoxyethylene ethers and may be substituted, on an equivalent basis therefor, in the preparation of emulsifiers for use in the present invention without departing from the spirit of the invention.

Emulsifiable concentrates suitable for the preparation of emulsified coating compositions in accordance with the invention comprise from about 8% to about 33% by weight of an emulsifier dissolved or dispersed in an edible oil as hereinbefore described. Such mixtures are readily prepared by warming the oil to above its melting point, adding the calculated quantity of emulsifier, agitating until dissolved or thoroughly dispersed and allowing the mixture to cool. If desired, the mixture may be subjected to a creaming or texturizing process as is well known in the shortening art to yield an easily handled paste-like mass.

In the emulsified coating compositions of the invention, the emulsifier preferably comprises approximately 5% of the total although it may vary from about 4% to about 10% thereof. The edible vegetable oil phase may comprise from about 20% to about 50% of the total emulsion depending upon the viscosity of emulsion required for application. Preferred compositions contain amounts of the oil in the upper portion of the indicated range, particularly from 43 to 48 per cent of the total. The aqueous phase preferably contains sufficient sugar to supply about 5% sugar on the total composition and the balance of the phase is water. Coloring and flavoring agents may be added to either the oil or water phase depending on their solubilities although it is generally preferable to choose such agents as are soluble in the external, aqueous phase and introduce them in that medium. The amounts of such agents are usually so small that they can be ignored in the calculation of percentage compositions of the emulsions, being treated as additives to the 100% composition.

The emulsions may be prepared by combining the emulsifier with the vegetable oil and the sugar with the water separately, bringing both solutions to about 150° F., and adding one of said solutions to the other slowly with agitation and continuing the agitation while the emulsion cools to room temperature. It is a characteristic of the emulsions of the present invention that milling or homogenization is not required in their preparation, simple stirring supplying all of the agitation necessary.

The following examples are illustrative of emulsifiable concentrates and emulsified coating compositions in accordance with the invention.

Example I 75 parts by weight of an edible grade of coconut oil melting at 76° F., was warmed to approximately 100° F., mixed with 25 parts by weight of the tetralaurate of 20 polyoxyethylene sorbitol and allowed to cool.

Example II 25 parts by weight of the product of Example I and 75 parts by weight of a 7.3% solution of sugar in water were separately heated to 150° F. The sugar solution was added slowly with agitation to the coconut oil solution and stirring was continued while the resulting emulsion cooled. The composition so obtained was a low viscosity oil-in-water emulsion into which shaped ice cream masses or other frozen confections may be dipped for coating. Color and flavor may be added as desired to either the aqueous solution or the oil solution before combining the phases.

Example III

The oil phase is a solution comprising 5 parts of the tetralaurate of 20 polyoxyethylene sorbitol in 45.6 parts of a 2:1 mixture of a coconut oil melting at 76° F. and coconut oil hardened by hydrogenation to a melting point of 112° to 114° F.

The aqueous phase is 5.5 parts of sugar dissolved in 33.9 parts water.

Both phases are warmed to 150° F. and the oil phase added slowly to the aqueous phase with agitation. Stirring is continued until the composition is cool.

Example IV

In a jacketed kettle equipped with an agitator, 122.4 pounds of edible coconut oil, melting at 76° F. and 61.0 pounds of a coconut oil hardened by hydrogenation to a melting point of 112° to 114° F. were melted by heating to approximately 140° F. and holding at that temperature for a half hour after visible lumps had disappeared. 16.6 pounds of the pentaoleate of 30 polyoxyethylene sorbitol was added during the half hour heating. Cooling water was then introduced into the jacket and agitation continued while the kettle charge cooled to about 80° F. and passed through a pressure homogenizer, under strong cooling, together with nitrogen gas. There resulted a creamy, paste-like mass of an emulsifiable concentrate which could be easily handled in the preparation of oil-in-water emulsions by the method hereinbefore described.

The coating compositions of the invention are oil-in-water emulsions, fluid at room temperature, suitable for applying a thin waxy coating to ice cream or other frozen confection by dipping. The compositions may suitably be held at about 90° F. and the ice cream bar or other shaped mass dipped therein momentarily. Upon withdrawal a thin layer of emulsion will have been found to have hardened on the ice cream. It adheres well to the ice cream and remains solid as long as it is at the temperature of stored ice cream. When eaten, the emulsified coating softens and disperses at mouth temperatures, even though the hardened oils therein melt at temperatures well above body temperature, and there is no sensation of waxiness in the mouth.

The coating emulsion of the invention may be stored overnight, or longer, under refrigeration whereupon it will solidify. Simple warming to above the melting point of the oil phase and agitation suffices to restore the emulsion to its original condition and upon adjusting its temperature to approximately 90° F. it is ready for application again.

Many modifications of the specific examples disclosed hereinbefore which do not depart from the spirit of the invention will be readily apparent to those skilled in the art. Such modifications are to be considered as coming within the purview of the invention, which is defined in the appended claims.

What is claimed is:

1. A coating composition for frozen confections consisting essentially of an oil-in-water emulsion comprising an external aqueous phase; an internal oil phase consisting of an edible vegetable oil solid at the temperature of ice cream storage and liquefying within the temperature range of 75° F. to 115° F.; and, as an emulsifier therefor, an ester with an HLB value of from 9.5 to 11.5 which conforms to the formula:

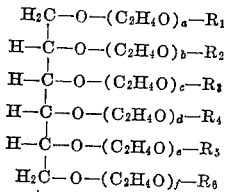

wherein $a$, $b$, $c$, $d$, $e$, and $f$ are each at least one, and the sum of $a$ to $f$ is from 20 to 40; and $R_1$, $R_2$, $R_3$, $R_4$, $R_5$ and $R_6$ are selected from the group consisting of hydrogen and fatty acyl radicals containing from 12 to 18 carbon atoms, there being at least 4 of such acyl radicals.

2. A coating composition as in claim 1 wherein the said emulsifier is the pentaoleate of 30 polyoxyethylene sorbitol.

3. A coating composition as in claim 1 wherein the said emulsifier is the tetralaurate of 20 polyoxyethylene sorbitol.

4. A coating composition as in claim 1 wherein the content of said edible vegetable oil in the emulsion is from about 20% to about 50% of the total; the content of said emulsifier is from about 4% to about 10% of the total; and the aqueous phase contains dissolved sugar to supply about 5% of the total composition.

5. A coating composition as in claim 4 wherein the said edible vegetable oil is hardened coconut oil.

6. A coating composition as in claim 5 wherein the said emulsifier is the pentaoleate of 30 polyoxyethylene sorbitol.

7. A coating composition as in claim 5 wherein the said emulsifier is the tetralaurate of 20 polyoxyethylene sorbitol.

8. An emulsifiable oil composition suitable for the preparation of coating compositions for frozen confections consisting essentially of a solution in an edible vegetable oil, solid at the temperature of ice cream storage and liquefying within the temperature range of 75° F. to 115° F. of an ester with an HLB value of from 9.5 to 11.5 which conforms to the formula:

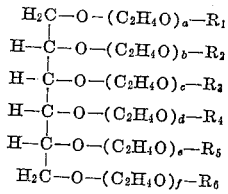

wherein $a$, $b$, $c$, $d$, $e$, and $f$ are each at least one, and the sum of $a$ to $f$ is from 20 to 40; and $R_1$, $R_2$, $R_3$, $R_4$, $R_5$ and $R_6$ are selected from the group consisting of hydrogen and fatty acyl radicals containing from 12 to 18 carbon atoms, there being at least 4 of such acyl radicals.

9. An emulsifiable oil composition as in claim wherein the said ester comprises from about 8 to about 33% of the total.

10. An emulsifiable oil composition as in claim 9 wherein the said ester is the pentaoleate of 30 polyoxyethylene sorbitol.

11. An emulsifiable oil composition as in claim 9 wherein the said ester is the tetralaurate of 20 polyoxyethylene sorbitol.

References Cited in the file of this patent

UNITED STATES PATENTS

| Number | Name | Date |
|---|---|---|
| 2,129,881 | Schildberger | Sept. 13, 1938 |
| 2,191,352 | Oprean | Feb. 20, 1940 |
| 2,422,486 | Johnston | June 17, 1947 |

OTHER REFERENCES

"Atlas Surface Active Agents," Atlas Powder Company, Industrial Chemicals Dept., Wilmington 99, Delaware, second printing, Tables I and II, appearing between pages 26 and 27.